Patented May 24, 1932

1,859,845

UNITED STATES PATENT OFFICE

JOHN D. RUE, OF MADISON, WISCONSIN, SIDNEY D. WELLS, OF QUINCY, ILLINOIS, AND FRANCIS G. RAWLING, OF MADISON, WISCONSIN, ASSIGNORS TO ARTHUR M. HYDE, SECRETARY OF AGRICULTURE OF THE UNITED STATES

TREATMENT OF WOOD FOR THE PRODUCTION OF PULP

No Drawing.    Application filed April 8, 1926.    Serial No. 100,685.

This invention relates to the treatment of wood for the production of pulp.

The object of this invention is to provide a process for separating the fibers of wood by dissolving the intercellular material, without causing a serious decomposition of the ligno-cellulose, at the same time producing a high yield of pulp substantially white and suitable for paper making purposes.

Heretofore, in the so-called bisulphite, soda and sulphate processes the ligno-celluloses are extensively decomposed, the lignin being dissolved together with a portion of the cellulose, thus producing low yields of pulp. Also, in the case of the soda and sulphate processes an undersirable brown color is formed. Likewise, even though the use of the normal sulphites of the alkali metals for digesting the wood results in a much less severe action on the ligno-cellulose and cellulose than what occurs in the processes mentioned above, nevertheless the color of the resulting pulp is not satisfactory.

Contrasted to such prior processes, the present invention provides for the use of normal sulphite within certain proportions with respect to the wood treated, also, it provides for alkali within certain strengths, also, for certain periods of treatment to soften the intercellular fiber, and also provides for control of acidity and alkalinity whereby coloring matter is dissolved and the pulp maintained white. Finally, the invention provides for the mechanical separation of the softened fibers from between which the intercellular material has been dissolved.

In this process less than twenty pounds of a normal sulphite but more than four pounds in aqueous solution are used for each hundred pounds of oven dry material in the wood and the digestion or heating is conducted in a suitable digesting vessel at temperatures between 120° and 170° C. in order to prevent the undesirable resolution or decomposition of the ligno-celluloses. Such amounts of normal sulphite are sufficient to prevent the formation of a brown color, which is developed when wood is subjected to temperatures above 110° C. In order to produce a substantially white pulp, it is necessary to provide a sufficient quantity of a carbonate or bicarbonate in solution to cause the solution of the small amount of coloring material which is produced in the process of digestion. As an excess of alkali will decompose the ligno-celluloses and produce an undesirable brown color, there is used in addition to the normal sulphite mentioned above, a less quantity than ten pounds but more than one pound of a carbonate or bicarbonate or a mixture of them, preferably those soluble in water, for each hundred pounds of oven dry material in the wood. During the process of digestion organic acids are formed which convert the carbonates into bicarbonates and ultimately a quantity of carbon dioxide is formed in the digestion vessel. The state of alkalinity of the digesting liquid during the process is dependent on the pressure of carbon dioxide, the temperature, and the amount of the carbonates in the digesting vessel, according to the reversible reaction expressed as follows:—

$$2RHCO_3 \rightleftharpoons R_2CO_3 + H_2O + CO_2$$

where R represents a metal, preferably sodium. By withdrawing carbon dioxide, acidity is avoided, some of the bicarbonate is decomposed and the normal carbonate is formed. Sufficient of the latter should be present in the digesting liquid to dissolve the coloring material mentioned above.

In practicing the process, the wood is cut to a suitable size and placed in a digesting vessel of suitable shape. The wood is impregnated with an aqueous solution containing substantially sodium sulphite, together with sodium carbonate or sodium bicarbonate or both or other salts capable of forming sodium sulphite, sodium carbonate or bicarbonate in the solution, so that after the excess solution is withdrawn not more than twenty pounds of sodium sulphite remain in the digester for each hundred pounds of oven dry material in the wood, and not more than ten pounds of sodium carbonate or bicarbonate or both together for each hundred pounds of oven dry material in the wood. Other examples of such an impregnating material are a mixture of sodium bisulphite and sodium carbonate; or a mixture of sodium bisulphite and sodium bicarbonate; or a mixture of calcium carbonate, sodium aluminate and sodium bisulphite. The use of sodium salts is preferable but the salts of other alkali metals may be used. The wood may be impregnated in the digesting vessel or another vessel with the solution of these salts by any suitable means with or without previous steaming of the wood, but preferably by the application of a vacuum to the digester containing the wood and solution mentioned above, followed by a pressure considerably in excess of atmospheric, such as 100 pounds per square inch. Any suitable temperature may be employed during the process of impregnation, preferably between 25° C. and 100° C. After the period of impregnation, for example 30 to 60 minutes, the excess solution is withdrawn from the digester and may be used again in a subsequent impregnation. The contents of the digester are heated by any suitable means, preferably by the admission of steam, so that the temperature does not exceed 170° C. During the process of heating, carbon dioxide and steam are released from the digester at a suitable rate either periodically or continuously so that a proper degree of alkalinity is maintained in the digester to dissolve the coloring materials present. Without adequate alkalinity, there would otherwise be an acid tendency as result of which the wood material would become discolored and rendered undesirable as pulp for paper.

After the period of heating the contents of the digester are removed by any suitable method, either under pressure or after the pressure in excess of atmospheric has been removed.

The material removed from the digester, is broken up and washed by a suitable method, then subjected to a treatment in one or more suitable types of disintegrating apparatus such as a beater, rod mill, ball mill and others as result of which it appears at a substantially white pulp suitable for paper making purposes, such as the manufacture of newsprint and the like.

The following examples are typical for the treatment of such material as black gum wood, jack pine wood, and aspen wood:

1. Black gum wood is impregnated with an aqueous solution containing substantially sodium sulphite and sodium bicarbonate so that about 6 pounds of sodium sulphite and about 5 pounds of sodium bicarbonate remain for each 100 pounds of oven dry material in the wood. The wood is steamed at a temperature of 150° C. for a period of two or three hours, during which time carbon dioxide and steam are released from time to time from the digester.

2. Jack pine wood is steamed for thirty minutes at 110° C. and is then impregnated with an aqueous solution containing substantially sodium sulphite and sodium carbonate so that about 12 pounds of sodium sulphite and about 3 pounds of sodium carbonate remain for each 100 pounds of oven dry material in the wood. The impregnated wood is steamed at a temperature of 165° C. for a period of three or four hours, during which time suitable amounts of carbon dioxide and steam are released from the digester.

3. Aspen wood is impregnated with an aqueous solution containing substantially sodium sulphite and sodium bicarbonate so that about 6 pounds of sodium sulphite and 4 pounds of sodium bicarbonate remain for each 100 pounds of oven dry material in the wood. The wood is steamed at a temperature of 150° C. for four hours, carbon dioxide and steam being released from the digester at suitable periods.

From the foregoing description, it will be obvious that details are provided whereby the white pulp may be formed from various kinds of wood, and that details of control and operation are disclosed whereby the manufacture of the pulp may be carried through the stage of softening the intercellular material or more completely by means of mechanical treatment the previously softened material may be separated into condition ready for use in the manufacture of paper.

We claim:—

1. The process of manufacturing wood pulp which comprises treating wood so as to dissolve the intercellular material without materially decomposing the ligno cellulose content of the wood by first subjecting the wood to a chemical treatment consisting of digesting it with a non-acid aqueous solution containing a sulphite and a weak alkali and capable of producing carbon dioxide during the period of digestion, boiling the wood and chemicals under pressure greater than atmospheric pressure and in a condition of non-acidity during which boiling treatment carbon dioxide gas is formed, releasing carbon dioxide gas and steam during the boiling period, and secondly subjecting the woody material thus treated to a mechanical separating action wherein the fibers from which the intercellular material have been dissolved out by the digesting treatment are separated into pulp.

2. In the process of manufacturing pulp, the steps of preparing the wood for mechanical treatment which consists in treating wood so as to dissolve the intercellular material without materially decomposing the ligno cellulose content of the wood by subjecting the wood to a chemical treatment consisting of digestion with a non-acid aqueous solution containing a sulphite and an alkali and capable of producing carbon dioxide during the period of digestion, boiling the wood and chemicals under pressure and in a condition of non-acidity during which boiling treatment carbon dioxide gas is formed, and releasing carbon dioxide gas and steam during the boiling period.

3. In the process of manufacturing pulp, the steps of preparing the wood for mechanical treatment which consists in treating wood so as to dissolve the intercellular material without materially decomposing the ligno cellulose content of the wood by subjecting the wood to a chemical treatment consisting of digestion with an aqueous solution containing sodium sulphite and an alkali and capable of producing carbon dioxide during the period of digestion, boiling the wood under pressure, and releasing carbon dioxide gas and steam during the boiling period.

4. In the process of manufacturing pulp, the steps of preparing the wood for mechanical treatment which consists in treating wood so as to dissolve the intercellular material without materially decomposing the ligno cellulose content of the wood by subjecting the wood to a chemical treatment consisting of digestion with an aqueous solution containing sodium sulphite and sodium carbonate and capable of producing carbon dioxide during the period of digestion, boiling the wood under pressure, and releasing carbon dioxide gas and steam during the boiling period.

5. In the process of manufacturing pulp, the steps of preparing the wood for mechanical treatment which consists in treating wood so as to dissolve the intercellular material without materially decomposing the ligno cellulose content of the wood by subjecting the wood to a chemical treatment consisting of digestion with a non-acid aqueous solution containing a sulphite and an alkali capable of producing carbon dioxide during the period of digestion, boiling the wood and chemicals under pressure and in a condition of non-acidity during which boiling treatment carbon dioxide gas is formed, and releasing carbon dioxide gas and steam during the boiling period, the total amount of sulphite and alkali in proportion to the dry material of the wood being less than twenty pounds of sulphite and less than ten pounds of alkali for each one hundred pounds of oven dry material in the wood.

6. In the process of manufacturing pulp, the steps of preparing the wood for mechanical treatment which consists in treating wood so as to dissolve the intercellular material without materially decomposing the ligno cellulose content of the wood by subjecting the wood to a chemical treatment consisting of digestion with an aqueous solution containing sodium sulphite and an alkali and capable of producing carbon dioxide during the period of digestion, boiling the wood under pressure, and releasing carbon dioxide gas and steam during the boiling period, the total amount of sodium sulphite and alkali present in proportion to the dry material of the wood being less than twenty pounds of sulphite and less than ten pounds of alkali for each one hundred pounds of oven dry material in the wood.

7. In the process of manufacturing pulp, the steps of preparing the wood for mechanical treatment which consists in treating the wood so as to dissolve the intercellular material without materially decomposing the ligno cellulose content of the wood by subjecting the wood to a chemical treatment consisting of digestion with an aqueous solution containing sodium sulphite and sodium carbonate and capable of producing carbon dioxide during the period of digestion, boiling the wood under pressure, and releasing carbon dioxide gas and steam during the boiling period, the total amount of sodium sulphite and sodium carbonate present in proportion to the amount of dry material of the wood being less than twenty pounds of sulphite and less than ten pounds of carbonate for each one hundred pounds of oven dry material in the wood.

8. In the process of manufacturing pulp and in the preliminary treatment of wood prior to mechanical disintegration, the steps which include treating the wood by digesting it in a non-acid aqueous solution including sodium sulphite and a weak alkali and capable of producing carbon dioxide during the period of digestion, boiling the wood and chemicals under pressure and in a condition of non-acidity during which boiling treatment carbon dioxide gas is formed, and controlling the alkalinity of the solution by the release of suitable amounts of carbon dioxide and steam during the boiling period.

9. In the process of manufacturing pulp and in the preliminary treatment of wood prior to mechanical disintegration, the steps which include treating the wood by digesting it in a non-acid aqueous solution including a sulphite and an alkali and capable of producing carbon dioxide during the period of digestion, boiling the wood and chemicals under pressure and in a condition of non-acidity during which boiling treatment carbon dioxide gas is formed, and controlling the alkalinity of the solution by the release of suitable amounts of carbon dioxide and steam during the boiling period.

10. In the process of manufacturing pulp and in the preliminary treatment of wood prior to mechanical disintegration, the steps which include treating the wood by digesting it in a non-acid aqueous solution including a sulphite and an alkali and capable of producing carbon dioxide during the period of digestion, boiling the wood and chemicals under pressure, and in a condition of non-acidity during which boiling treatment carbon dioxide gas is formed, and effecting the dissolving of coloring material present by maintaining alkalinity and avoiding acidity by releasing carbon dioxide and steam from the digesting apparatus during the boiling period.

11. In the process of manufacturing pulp, the steps of preparing the wood for mechanical treatment which consists in treating wood so as to dissolve the intercellular material without materially decomposing the ligno cellulose content of the wood by subjecting it to a steaming treatment and afterward subjecting it to a chemical treatment consisting of digestion with a non-acid aqueous solution containing a sulphite and a carbonate and capable of producing carbon dioxide during the period of digestion, boiling the wood and chemicals under pressure and in a condition of non-acidity during which boiling treatment carbon dioxide gas is formed, releasing carbon dioxide and steam during the boiling period, the total amount of sulphite and carbonate present in proportion to the amount of dry material of the wood being less than twenty pounds of sulphite and less than ten pounds of carbonate for each one hundred pounds of oven dry material in the wood.

12. In the production of fibers from vegetable material for use in making paper, the method of softening the material to prepare it for subsequent mechanical separation of the fibers which comprises mildly cooking the vegetable material until softened but not pulped into its ultimate fibers with a chemical agent which consists of a solution of sodium carbonate and sodium sulphate.

13. In the production of fibers from vegetable material for use in making paper, the method of softening the material to prepare it for subsequent mechanical separation of the fibers which comprises mildly cooking the vegetable material until softened but not pulped into its ultimate fibers with a chemical agent which consists wholly of an aqueous solution of sodium carbonate and sodium sulphite.

14. In the production of fibers from vegetable material for use in making paper, the method of softening the material to prepare it for subsequent mechanical separation of the fibers which comprises mildly cooking the vegetable material until softened but not pulped into its ultimate fibers with a chemical agent which consists of a solution of an alkaline carbonate and an alkaline sulphite.

15. In the production of fibers from vegetable material for use in making paper, the method of softening the material to prepare it for subsequent mechanical separation of the fibers which comprises mildly cooking the vegetable material until softened but not pulped into its ultimate fibers with a chemical agent which agent consists wholly of an aqueous solution of an alkaline carbonate and an alkaline sulphite.

16. In the production of fibers from vegetable material for use in making paper, the method of softening the material to prepare it for subsequent mechanical separation of the fibers which comprises mildly cooking the vegetable material until softened but not pulped into its ultimate fibers with a chemical agent which consists of a solution of sodium carbonate and sodium sulphite, the former being in quantities sufficient to neutralize the acids formed by the hydrolytic action of the sulphite.

17. In the production of fibers from vegetable material for use in making paper, the method of softening the material to prepare it for subsequent mechanical separation of the fibers which comprises first softening the vegetable material by subjecting it to a chemical treatment by mildly cooking the same until softened but not pulped into its ultimate fibers with a chemical agent which consists of sodium carbonate and sodium sulphite, the former being in quantities sufficient to neutralize the acids formed by the hydrolytic action of the sulphite, and thereafter mechanically separating the fibrous material thus previously chemically treated.

18. In the production of fibers from vegetable material for use in making paper, the method of softening the material to prepare it for subsequent mechanical separation of the fibers which comprises first softening the vegetable fibers by subjecting the vegetable material to a chemical treatment which includes mildly cooking the same until softened but not pulped into its ultimate fibers with a chemical agent consisting of an aqueous solution of an alkaline carbonate and sodium sulphite, and thereafter mechanically separating the fibrous material thus previously chemically treated.

19. In the process of manufacturing pulp, the steps of preparing the wood for mechanical treatment which consists in treating wood so as to dissolve the intercellular material without materially decomposing the ligno cellulose content of the wood by subjecting the wood to a chemical treatment consisting of digestion with a non-acid aqueous solution containing a sulphite and the alkali metal salt of a weakly ionized polybasic acid having a pH value in unimolar solution of from seven to eleven and capable of producing carbon dioxide during the period of digestion, boiling the wood and chemicals under pressure and in a condition of non-acidity during which boiling treatment carbon dioxide gas is formed, and releasing carbon dioxide gas and steam during the boiling period.

20. In the production of fibers from vegetable material for use in making paper, the method of softening the material to prepare it for subsequent mechanical separation of the fibers which comprises mildly cooking the vegetable material until softened but not pulped into its ultimate fibers with a chemical agent which consists of a solution of sodium sulphite and the alkali metal salt of a weakly ionized polybasic acid having a pH value in unimolar solution of from seven to eleven.

21. In the production of fibers from vegetable material for use in making paper, the method of softening the material to prepare it for subsequent mechanical separation of the fibers which comprises mildly cooking the vegetable material until softened but not pulped into its ultimate fibers with a chemical agent in solution form comprising alkali metal sulphite and the carbonate of an alkali metal and which solution is substantially free from a sulphide.

22. In the production of fibers from vegetables material for use in making paper, the method of softening the material to prepare it for subsequent mechanical separation of the fibers which comprises first softening the vegetable fibers by subjecting the vegetable material to a chemical treatment which includes mildly cooking the same until softened but not pulped into its ultimate fibers with a chemical agent comprising an aqueous solution of sodium sulphite and the alkali metal salt of a weakly ionized polybasic acid having a pH value in unimolar solution of from seven to eleven, and thereafter mechanically separating the fibrous material thus previously chemically treated.

23. In the production of fibers from vegetable material for use in making paper, the method of softening the material to prepare it for subsequent mechanical separation of the fibers which comprises first softening the vegetable fibers by subjecting the vegetable material to a chemical treatment which includes mildly cooking the same until softened but not pulped into its ultimate fibers with a chemical agent comprising an aqueous solution of alkali metal sulphite and the carbonate of an alkali metal and which solution is substantially free from a sulphide, and thereafter mechanically separating the fibrous material thus previously chemically treated.

24. The method of making pulp from wood which comprises digesting the wood with a solution containing as the two essential chemical ingredients normal sodium sulfite and carbonate of sodium.

25. In the method of making pulp from wood, the treatment comprising digesting wood with a solution containing as the two essential chemical ingredients normal sodium sulphite and carbonate of sodium.

26. In the method of making pulp from wood, the treatment comprising digesting wood with a solution containing as the two essential chemical ingredients normal sodium sulphite and carbonate of sodium, followed by mechanical disintegration of the wood.

27. The method of making pulp from wood, which comprises digesting the wood with a solution containing as the two essential chemical ingredients alkali salts of sulfurous and carbonic acids.

28. As a new article of manufacture, an unbleached pulp of light color and great strength, resulting from the cooking of wood with sodium sulphite liquor slightly alkaline with an alkali metal carbonate.

29. The method of producing pulp, which comprises treating wood, at an elevated temperature, with a liquor containing a sulphite of sodium and a carbonate of sodium in sufficient quantities to render the wood fibers readily separable.

30. The process of producing wood pulp, which comprises treating wood at an elevated temperature with a liquor containing sodium sulphite and a lesser amount of a carbonate of sodium until wood fibers are rendered separable, and thereafter treating the resulting fibrous material to separate wood fibers whereby wood pulp is produced.

In testimony whereof, we affix our signatures.

JOHN D. RUE.
SIDNEY D. WELLS.
FRANCIS G. RAWLING.